Patented Aug. 25, 1936

2,052,218

UNITED STATES PATENT OFFICE 2,052,218

PROCESS OF CONCENTRATING THE VITAMIN CONTENT OF MILK AND PRODUCTS

Charles Dickens, Oakland, Calif.

No Drawing. Application October 19, 1932, Serial No. 638,649

4 Claims. (Cl. 167—81)

This invention relates to a process of making a vitamin concentrate suitable for use as or in food and medicine from milk and milk products.

It is common knowledge that whole milk and some of its by-products and derivatives, such as buttermilk, skim milk, whey, condensed milk, evaporated milk, and powdered milk contain the anti-neuritic and pellagra preventing vitamins known as vitamins B, F and G.

An object of the present invention is to provide a concentrate of such vitamins suitable for use as or in foods and medicines. A further object of the invention is to recover these vitamins in usable form from milk and by-products or derivatives thereof in which they may and frequently are of no utility or are wasted. In accordance with my invention the vitamins B, F and G are separated from certain constituents of the milk, such as the casein, fats, lactose and lactic acid, and recovered in the form of a relatively highly concentrated solution or liquid of high vitamin potency.

The following example is illustrative of the treatment of whey:

The whey is first concentrated by distillation or evaporation under sub-atmospheric pressure at a temperature not exceeding 95° C., and preferably at a temperature between 45° C. and 85° C. In general the lower is the temperature applied in the concentration of the whey the higher will be the vitamin potency of the product. The concentration is carried to a point at which the volume of the liquid concentrate is about one-tenth of the volume of the whey used. At this point alkaline material, such as lime or slaked lime or other alkaline earth metal oxid or hydroxid, or an alkaline alkali metal compound, such as sodium or potassium hydroxid or carbonate, is added in quantity sufficient to produce in the resulting liquid a pH value of about 6 and not exceeding 7, i. e. substantially neutral or slightly acid. The neutralized liquid is allowed to stand and settle for a period of about twelve hours or longer, for example, over night, and the clear liquid is then separated from solid matter. For example, the supernatant liquid is decanted, the turbid residual liquid is filtered or centrifuged, and the clear liquid so obtained is added to that separated by decantation. The resulting clear liquid is then mixed with from one-fourth to one-half its volume of methyl or ethyl alcohol, preferably ethyl alcohol of 95% to 99% concentration, and allowed to stand for about four hours. The resulting precipitate is separated by filtration or centrifuging and the clear solution evaporated or distilled under vacuum at a temperature not exceeding 95° C. and preferably between 45° C. and 85° C. to half or less the volume of the clear liquid to which the alcohol was added. The liquid is thus freed of alcohol which may be condensed and recovered for re-use.

The resulting clear aqueous liquid is allowed to stand for from one to three days preferably at a temperature of from 5 to 15° C., and the precipitate so formed is separated by filtering or centrifuging, after which the liquid is preserved for use, e. g. it is bottled and pasteurized for an hour at 65° C. on at least two successive days. The liquid or concentrate is practically free of fat, casein, lactose and lactic acid. It contains, however, practically all of the mineral salts of the original milk and all of the vitamins B, F and G in relatively concentrated form. In the operations described a concentration of more than twenty to one is accomplished. It may be more highly concentrated in either or both of the evaporating steps, or if desired, it may be less highly concentrated. Also, if desired, the final product may be diluted with water or mixed with other alimentary materials, such as fruit juice, or it may be added to milk to increase its vitamin potency. Numerous other uses of the product will be evident to the physician and dietician. The most important aspect of the invention is that the vitamin content of the milk is preserved and brought into a relatively concentrated form capable of use under a wide variety of conditions. Practically none of the original vitamin potency of the milk is lost or destroyed in the concentrating process.

In applying the concentrating process to whole milk, evaporated milk, condensed milk, buttermilk and skim milk, the butter fat and curd are first separated in known manner to produce a liquid equivalent to whey, which is the starting material in the above described operation. Powdered milk is best treated by extraction with 50% to 80% methyl or ethyl alcohol, after which the process proceeds in the same manner as with whey.

I have found concentrations of about 200 to 1 based upon whole milk as the starting material to be satisfactory and still higher concentrations are contemplated. The finished product contains small amounts of lactose and calcium salts in addition to the vitamins and the bulk of the mineral salt content of the milk or whey. It is of an amber color and has the odor of beef extract and is slightly sour or acid. It is useful for correcting dietary deficiencies and as a remedy for dermatitis, senility, and the decay of cells in the bodies of humans and animals.

I claim:

1. Process of concentrating the vitamin content of milk which comprises producing therefrom a liquid equivalent to whey, concentrating said liquid by evaporation at a temperature not exceeding 95° C. to about one tenth of its original volume, adjusting the acidity of the liquid to from about pH6 to not exceeding pH7, allowing the liquid to stand and separating filterable solid matter therefrom, mixing the liquid with from about one-half to one-fourth of its volume of alcohol, allowing the mixture to stand and separating filterable solid matter therefrom, removing the alcohol by distillation at a temperature not exceeding 95° C., allowing the liquid to stand for at least about 24 hours, and separating filterable solid matter to produce a concentrated vitamine containing product free from solid matter.

2. Process of concentrating the vitamin content of milk as defined in claim 1, in which the liquid equivalent to whey is evaporated at a temperature not exceeding 85° C. under subatmospheric pressure.

3. Process of recovering the vitamin content of whey in concentrated form and substantially free of casein, fat, lactose and lactic acid, which comprises evaporating the whey in vacuo at a temperature of from 45° C. to 85° C. to a volume of not more than about one tenth of the original volume, reducing the acidity of the concentrated liquid to from pH6 to pH7, separating any solid matter which precipitates on standing, mixing the liquid with alcohol and separating any solid matter which precipitates on standing, removing the alcohol by vacuum distillation at a temperature of from 45° C. to 85° C., cooling the resulting liquid and separating any solid matter which precipitates on standing to produce a concentrated vitamine containing product free from solid matter.

4. Process of preparing a concentrated aqueous solution of the water soluble vitamin content of natural products containing the same which comprises separating the liquid portion of such natural products from the filterable solid portion, concentrating said liquid portion by evaporation under sub-atmospheric pressure at a temperature not exceeding 95° C. to not more than about one tenth its original volume, removing any filterable solid material which separates on standing, mixing the resulting clear liquid with at least about one fourth its volume of alcohol, removing from the resulting mixture any filterable solids which separate on standing, distilling the alcohol out of the resulting clear liquid under sub-atmospheric pressure and at a temperature not exceeding 95° C., allowing the resulting liquid residue to stand for several days and removing any filterable solids which separate therefrom to produce a concentrated vitamine containing product free from solid matter.

CHARLES DICKENS.